No. 834,757. PATENTED OCT. 30, 1906.
W. F. ROPER.
FILLING DETECTING MECHANISM FOR LOOMS.
APPLICATION FILED DEC. 18, 1905.
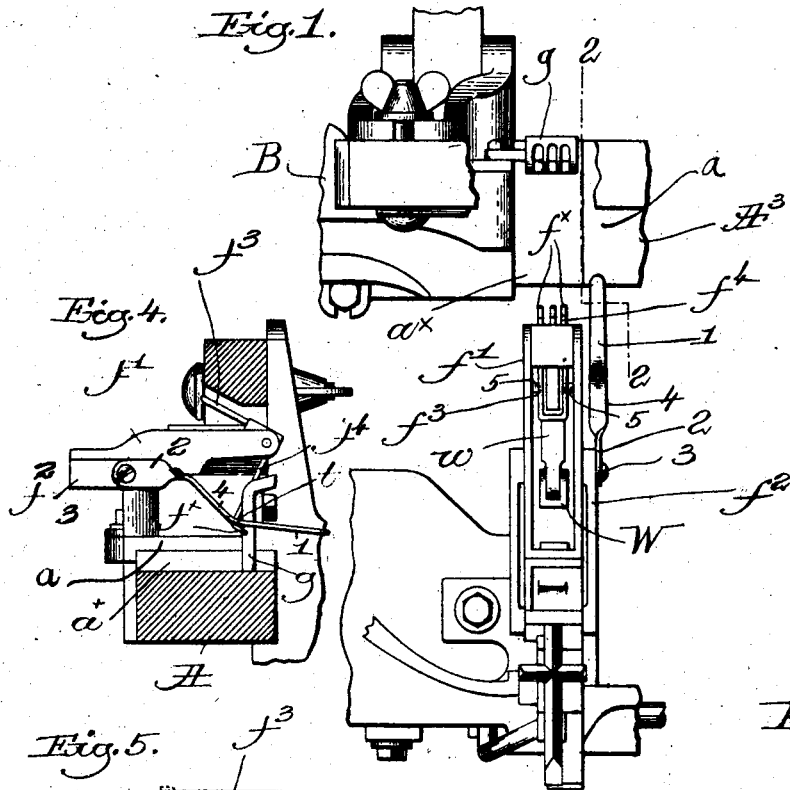
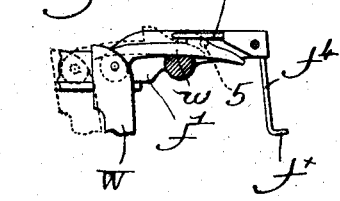
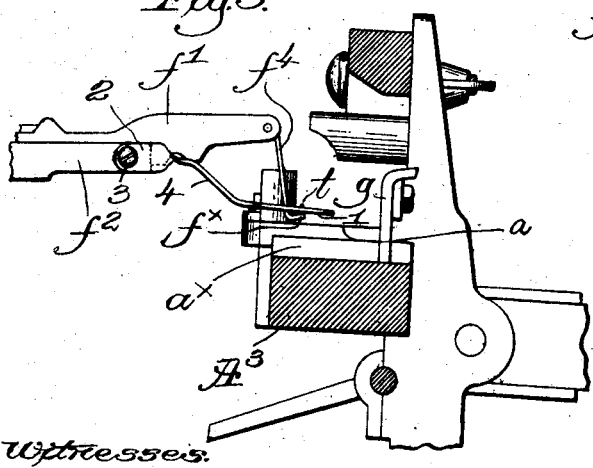
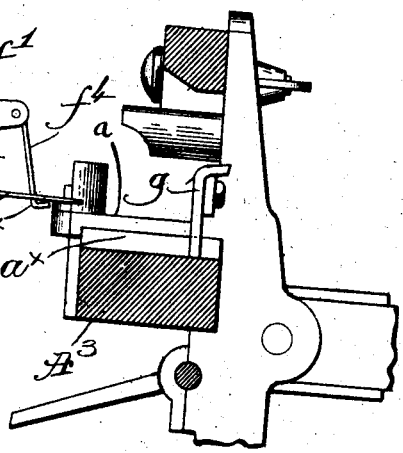
Witnesses.
Thomas J. Drummond.
Edward F. Allen.
Inventor.
Walter F. Roper,
by Crosby Gregory
attys.
THE NORRIS PETERS CO., WASHINGTON, D. C.

UNITED STATES PATENT OFFICE.

WALTER F. ROPER, OF HOPEDALE, MASSACHUSETTS, ASSIGNOR TO DRAPER COMPANY, OF HOPEDALE, MASSACHUSETTS, A CORPORATION OF MAINE.

FILLING-DETECTING MECHANISM FOR LOOMS.

No. 834,757.     Specification of Letters Patent.     Patented Oct. 30, 1906.

Application filed December 18, 1905. Serial No. 292,118.

*To all whom it may concern:*

Be it known that I, WALTER F. ROPER, a citizen of the United States, and a resident of Hopedale, county of Worcester, State of Massachusetts, have invented an Improvement in Filling-Detecting Mechanism for Looms, of which the following description, in connection with the accompanying drawings, is a specification, like characters on the drawings representing like parts.

The tines of the filling-fork on a loom are generally made quite long in order to insure proper engagement with the filling on the detecting-pick and to reduce as much as possible the chance of the filling passing beneath the tines, for if this occurs the filling is broken as the lay swings back or the filling will foul the fork, preventing its proper operation and also tending to produce faults in the selvage. With the long-tined fork, however, a trailing filling end is almost sure to engage the tines and tilt the fork when it should remain quiescent, in order to effect a change in the operation of the loom, such as its stoppage, or a replenishment of filling in an automatic loom.

My present invention has for its object the production of filling-detecting means so constructed and arranged that if the filling is broken or spent in such manner that a trailing end is left opposite the fork the trailing end will pass beneath the fork and the latter will not be tilted.

In accordance with my invention the fork-tines are made so short that while they will engage and be tilted by intact filling a trailing filling end extending from the selvage or the shuttle will pass under the tines, and such filling end being unsupported by both shuttle and selvage drops onto the raceway of the lay and cannot engage the short tines and tilt the fork. With such a short-tined fork the engagement with intact filling might tend to tilt the fork to such an extent that the filling would pass beneath the tines and prevent the proper operation of the fork. To obviate such action, I bend the lower or free ends of the tines rearwardly for a short distance, making a species of filling-support, the filling being held in the angle on the beat-up, and thereby effectually prevented from sliding down off the fork. After the shuttle has been picked to lay the filling the lay swings forward before the fork contacts with the filling, causing the filling to slacken, and it may drop almost to the raceway even if unbroken.

With the short fork herein devised by me such slackening of the filling might cause it to pass under the tines, and to prevent it I have provided simple and efficient means to insure the presentation of the filling to the fork at the proper height. Means have also been provided to prevent rebound of the fork after tilting thereof by the filling.

The various novel features of my invention will be fully described in the subjoined specification and particularly pointed out in the following claims.

Figure 1 is a top plan view of a sufficient portion of the filling-detecting mechanism of a loom to be understood with one embodiment of my invention applied thereto. Fig. 2 is a transverse section on the line 2 2, Fig. 1. Fig. 3 is a similar view, but showing the operation of my invention as the lay beats up on the detecting-pick. Fig. 4 is a like view showing the lay fully forward and the filling-fork and filling in proper coöperation; and Fig. 5 is a detail of the fork-slide and fork with the nearer side of the slide removed to show the means for preventing the fork from engaging the weft-hammer hook after the fork has been tilted, such means coöperating with the fork to prevent rebound thereof.

The lay $A^3$, its raceway $a$, transversely recessed at $a^\times$ and having the usual grid $g$, the fork-slide $f'$, mounted to slide in the fixed stand $f^2$, and the filling-fork, mounted to tilt in the slide and provided with a tail $f^3$ and depending tines $f^4$, may be and are all of substantially well-known construction, except that herein the tines are much shorter than at present constructed—so short, in fact, as to pass above the plane of the raceway—and, furthermore, the lower ends of the tines are bent rearward for a short distance, as at $f^\times$, for a purpose to be described, the bent portions being substantially at right angles to the tines. The engagement of the tines with the intact filling on the detecting-pick acts to tilt the fork and elevate the tail thereof out of the path of the hook $w$ of the weft-hammer W, Fig. 1, in usual manner.

Referring to Fig. 3, the intact filling is indicated at $t$ as the lay begins to swing forward, such filling being above the bends $f^\times$, and at the proper time the fork will be tilted, as shown in Fig. 4. Should the fork be tilted to an improper degree, the filling cannot pass beneath the ends of the tines because of the bends $f^\times$, for they cause the filling to be held in the angle or corner formed by the tines and bends and effectually prevented from sliding down off the fork. When the filling fails and leaves a trailing end in front of the fork, such filling end will drop onto the raceway and the short tines will pass free and clear over the filling end, so that no tilting of the fork can occur.

After the intact filling is laid and the lay moves forward, slackening the filling, so that it tends to drop toward the raceway, but before the filling has begun to slacken, it has passed over the point of a guide 1, as shown in Fig. 3, made as a flat and thin blade-like piece of preferably resilient or spring metal. This guide is twisted at its front end at 2 and fixedly secured by a suitable screw 3 to the side of the stand $f^2$, as shown, the guide being bent or inclined downward and rearward at 4 toward the free end thereof, the tip of the guide passing across the raceway as the lay beats up and at one side of the grid $g$. Once the tip of the guide has passed under the filling the latter will be supported above the lower ends of the fork-tines, and as the lay continues its forward beat the filling is carried by the incline 4 to a proper height to engage the fork.

When the tilting of the fork is effected, as in Fig. 4, the filling is inclosed by the grid, guide, and the fork-tines and proper tilting of the fork is insured, and as the lay swings back the filling slides down the incline 4 and is moved away from contact with the guide. If, however, the filling fails and is unsupported by both selvage and shuttle on the detecting-pick, the trailing end will drop below the point or tip of the guide before the lay reaches either the guide or the fork, and both guide and fork will pass over the filling end without tilting the fork, and the proper change in the operation of the loom will be effected.

It will be manifest that even with the short tines described there is no probability of the intact filling passing under the fork, inasmuch as the guide positively elevates and maintains the filling elevated at the proper height to most efficiently coöperate with the fork.

Heretofore in filling-detecting mechanism the end of the fork-tail has generally dropped directly onto the weft-hammer hook after tilting of the fork, and as both parts are elastic and the hook is also in motion there is a rebound of the tail, causing the fork to jump or vibrate and interfering with its proper action.

As herein shown, the sides of the fork-slide $f''$ are provided with inturned lugs or projections 5, Figs. 1 and 5, which form the stop or rest for the fork-tail $f^3$, the rests being at such a height that when the weft-hammer W is fully back the tail will not rest on the hook $w$, as shown in full lines, Fig. 5. These rest-lugs 5 are so placed with relation to the free end of the tail that when the latter falls onto the lugs the tendency to rebound or jump up is just neutralized by the inertia of that portion of the tail $f^3$ beyond the lugs, such inertia tending to continue the downward or falling movement of the tail. Manifestly the location of the rest-lugs must vary with forks having differently-disposed weights and with varying lengths of tail, the location being such that the tendency to fall, due to inertia, will just neutralize the rebounding or rising tendency, and when the rest is so placed there will be no rebound or vibrational movement of the fork.

The fork is tilted by intact filling just in time to clear the hook-shoulder as the weft-hammer moves outward, and when the fork is released the tail drops onto the rests 5 rather than onto the back of the hook, (see dotted-line position of the hook, Fig. 5,) the tail thereafter rising up over the top of the hook-shoulder as the hook completes its backward stroke and again being sustained by the rests. Thus the fork-tail drops onto a relatively stationary rest or support, and as the rebound and vibration of the hook are practically eliminated the fork is "dead," as it may be termed, when the filling is brought into engagement therewith on the detecting-pick.

My invention is not restricted to the precise construction and arrangement herein shown and described, for the same may be modified in various particulars by those skilled in the art without departing from the spirit and scope of my invention.

Having fully described my invention, what I claim as new, and desire to secure by Letters Patent, is—

1. In a loom, in combination, a tilting filling-fork having short tines adapted to pass over and clear of a trailing filling end, and means to prevent intact filling from passing beneath the tines when the fork is tilted.

2. In a loom, in combination, a tilting filling-fork having short tines adapted to pass over and clear of a trailing filling end, and means carried by the fork to prevent intact filling from passing beneath the tines when the fork is tilted by such filling.

3. The combination, in a loom, of a tilting filling-fork having short tines bent rearwardly at their lower ends, the tines passing over a filling end, the bent ends of the tines preventing intact filling from sliding down and beneath the tines upon undue tilting of the fork.

4. In a loom, in combination, a tilting filling-fork, a lay, and a stationary guide adapted to pass under and lift the intact filling into operative position in front of the fork on the detecting forward beat of the lay.

5. In a loom, in combination, a filling-fork, its slide, a stand in which the slide is movably mounted, and means on said stand to positively lift the intact filling into operative position in front of the fork on the detecting-pick.

6. In a loom, in combination, a filling-fork, a lay having a grid opposite the fork, and a stationary guide mounted at one side of the fork, and rearwardly extended to cross the lay below the filling and lift the same when intact in front of the fork on the detecting-pick, said guide passing beneath the filling before the same has slackened by the beat-up of the lay.

7. The combination, in a loom, of a filling-fork adapted to be engaged and tilted by intact filling, and to pass over a trailing filling end, and stationary means to prevent the intact filling from passing under the fork when the filling slackens on the beat-up.

8. In a loom, in combination, a filling-fork having short tines, a lay having a grid opposite the fork and a thin, flat and stationary blade-like guide mounted at one side of the fork and having a portion inclined rearward and downward, to pass under and lift the intact filling in front of the fork above the lower ends of the tines on the detecting-pick.

9. The combination, in a loom, of a tilting filling-fork having the lower ends of its tines bent rearwardly, and means fixedly mounted adjacent the fork to lift the filling when intact above and in front of the bent ends of the tines on the detecting-pick, the bends preventing the filling from passing beneath the tines if the fork is unduly tilted.

10. In a loom, in combination, a tilting filling-fork having short tines adapted to pass over and clear of a trailing filling end, means on the fork to prevent intact filling from passing beneath the tines when the fork is unduly tilted, and means to pass under and insure proper positioning of the intact filling in front of the fork when such filling is slackened on the beat-up.

11. In a loom, a filling-fork adapted to be engaged and tilted by intact filling and to pass over a trailing filling end.

12. In a loom, a lay having a shuttle-raceway, and a filling-fork having the ends of its tines above the plane of said raceway.

In testimony whereof I have signed my name to this specification in the presence of two subscribing witnesses.

WALTER F. ROPER.

Witnesses:
GEORGE OTIS DRAPER,
ERNEST W. WOOD.